United States Patent [19]
Fridman et al.

[11] Patent Number: 5,357,034
[45] Date of Patent: Oct. 18, 1994

[54] LACTIDE POLYMERIZATION

[75] Inventors: Israel D. Fridman, Belmont; John Kwok, Holden; Ronald J. Downey, Leominster, all of Mass.; Speros P. Nemphos, League City, Tex.

[73] Assignee: Camelot Technologies Inc., Leominster, Mass.

[21] Appl. No.: 941,731

[22] Filed: Sep. 8, 1992

[51] Int. Cl.$^5$ ............................................. C08G 63/08
[52] U.S. Cl. ................................... 528/354; 528/480; 528/357; 549/274
[58] Field of Search ................. 528/354, 357, 480; 549/274

[56]  References Cited
U.S. PATENT DOCUMENTS

| | | | |
|---|---|---|---|
| 4,124,566 | 11/1978 | Saiki et al. | 528/177 |
| 4,810,775 | 3/1989 | Bendix et al. | 528/480 |
| 4,983,745 | 1/1991 | Muller et al. | 528/354 X |
| 5,069,750 | 12/1991 | Aboul-Nasr | 159/2.001 |
| 5,142,023 | 8/1992 | Gruber et al. | 528/354 |
| 5,247,058 | 9/1993 | Gruber et al. | 528/354 |
| 5,247,059 | 9/1993 | Gruber et al. | 528/354 |
| 5,258,488 | 11/1993 | Gruber et al. | 528/354 |

FOREIGN PATENT DOCUMENTS 0261572  9/1987  Fed. Rep. of Germany ......... C07D 312/12
WO90/01521  2/1990  PCT Int'l Appl. .......... C08L 67/04

OTHER PUBLICATIONS

Dharas et al., U.S. Ser. No. 659,567 dated Feb. 22, 1991.
Castriotta et al., U.S. Ser. No. 757,923 dated Sep. 12, 1991.

*Primary Examiner*—John Kight, III
*Assistant Examiner*—Shelley A. Dodson
*Attorney, Agent, or Firm*—Bruce E. Harang

[57] ABSTRACT

High molecular weight polylactic acid is generally produced by the polymerization of lactide. Lactide is prepared by the depolymerization of low molecular weight polylactic acid. There are difficulties in the preparation of high molecular weight polylactic acid and high purity lactide isomers due to the equilibrium between lactic acid, low molecular weight polylactic acid, high molecular weight polylactic acid, lactide and water. Further it has never been proposed to provide a continuous process to produce high molecular weight polylactic acid from lactic acid. The present invention overcomes the equilibrium problem and provides a continuous process.

33 Claims, 6 Drawing Sheets

LACTIDE POLYMERIZATION

FIELD OF THE INVENTION

The present invention relates to the production of high molecular weight polylactic acid. More particularly the present invention relates to a process in which crude lactide may be produced continuously from aqueous lactic acid; a process in which crude lactide may be purified by melt recrystallization optionally continuously and a process in which purified lactide may be continuously polymerized to a high molecular weight polymer having useful properties.

BACKGROUND OF THE INVENTION

U.S. patent application Ser. No. 659,567 filed Feb. 22, 1991, U.S. Pat. No. 5,136,017 (corresponding to Canadian Patent Application No. 2,056,549 filed Nov. 28, 1991) discloses a continuous process for the polymerization of lactide to polylactic acid. The patent does not contemplate a process beginning with lactic acid as a raw material. Furthermore, the patent application does not disclose any procedure by which lactide may be prepared from lactic acid. Nor does the patent application disclose a process starting from lactic acid which may be operated continuously.

WO 90/01521 in the name of Battelle Memorial Institute published Feb. 22, 1990 discusses the polymerization of polylactic acid while maintaining residual monomer in the polymer to act as a plasticizer. The disclosure is of interest in that there is a fairly lengthy discussion of the prior art processes used to prepare polylactic acid. Most of the processes described as prior art disclose polymerizing lactic acid or lactide. There is no strong discussion regrading the preparation of lactide.

European Patent Application 0 261 572 in the name of Boehringer Ingelheim KG published 16.09.87 discloses a process in which polylactic acid is heated in the presence of a catalyst, and under vacuum, at temperatures from 130° to 230° C. and lactide is distilled off. The polylactic acid should have a molecular weight from 400 to 2,000, preferably from 500–800. In the polymerization of lactic acid, lactic acid is first heated. Initially low molecular weight polylactic acid forms. However, as the reaction proceeds the low molecular weight polylactic acid begins to depolymerize and form lactide. Then an equilibrium is established between lactide, lactic acid, water and low molecular weight polylactic acid. The result is that it is very difficult to directly polymerize high molecular weight polylactic acid from lactic acid. Rather, one must first prepare lactide and then subject it to a ring opening polymerization. However, the above noted equilibrium makes it difficult to produce a relatively pure stream of lactide from an equilibrium mixture. Applicants have found that the above process can be integrated into a continuous process to produce high molecular weight polylactic acid. Additionally, applicants have found that by using the principle of fractional distillation, crude lactide can be separated from the equilibrium mixture. Furthermore, purification of crude lactide can be carried out by melt crystallization (i.e. recrystallization of molten crude lactide without the use of a solvent). This has not been suggested by any prior art.

There is a need for technology which:

(i) provides for the synthesis and separation of lactide from lactic acid;

(ii) provides for the purification of crude lactide without the use of significant amounts of solvent; and (iii) provides in combination a continuous process for the polymerization of polylactic acid to high molecular weight polymer.

SUMMARY OF THE INVENTION

Accordingly, the present invention provides a series of process steps, optionally combined and continuous, for the preparation of high molecular polylactic acid, and various intermediates, comprising:

(i) dehydrating aqueous lactic acid and polymerizing lactic acid by condensation to a molecular weight from 400 to 5,000;

(ii) heating and reacting an equilibrium mixture comprising mainly polylactic acid having a molecular weight from 400 to 5,000, and small amounts of water, lactic acid, lactide and linear oligomers of lactic acid and lactide; depolymerizing polylactic acid to form lactide, (iii) distilling off a vapor phase comprising mainly lactide, lactic acid, linear oligomers of lactic acid and water;

(iv) in a separate unit operation further fractionating the distillate from step (iii) into crude lactide and a distillate phase, comprising in addition to lactide, water, lactic acid, and linear oligomers, which is optionally recycled to step (i);

(v) purifying the crude lactide by melt crystallization; and (vi) bulk or solution polymerizing the purified lactide.

DETAILED DESCRIPTION

Figure 1:
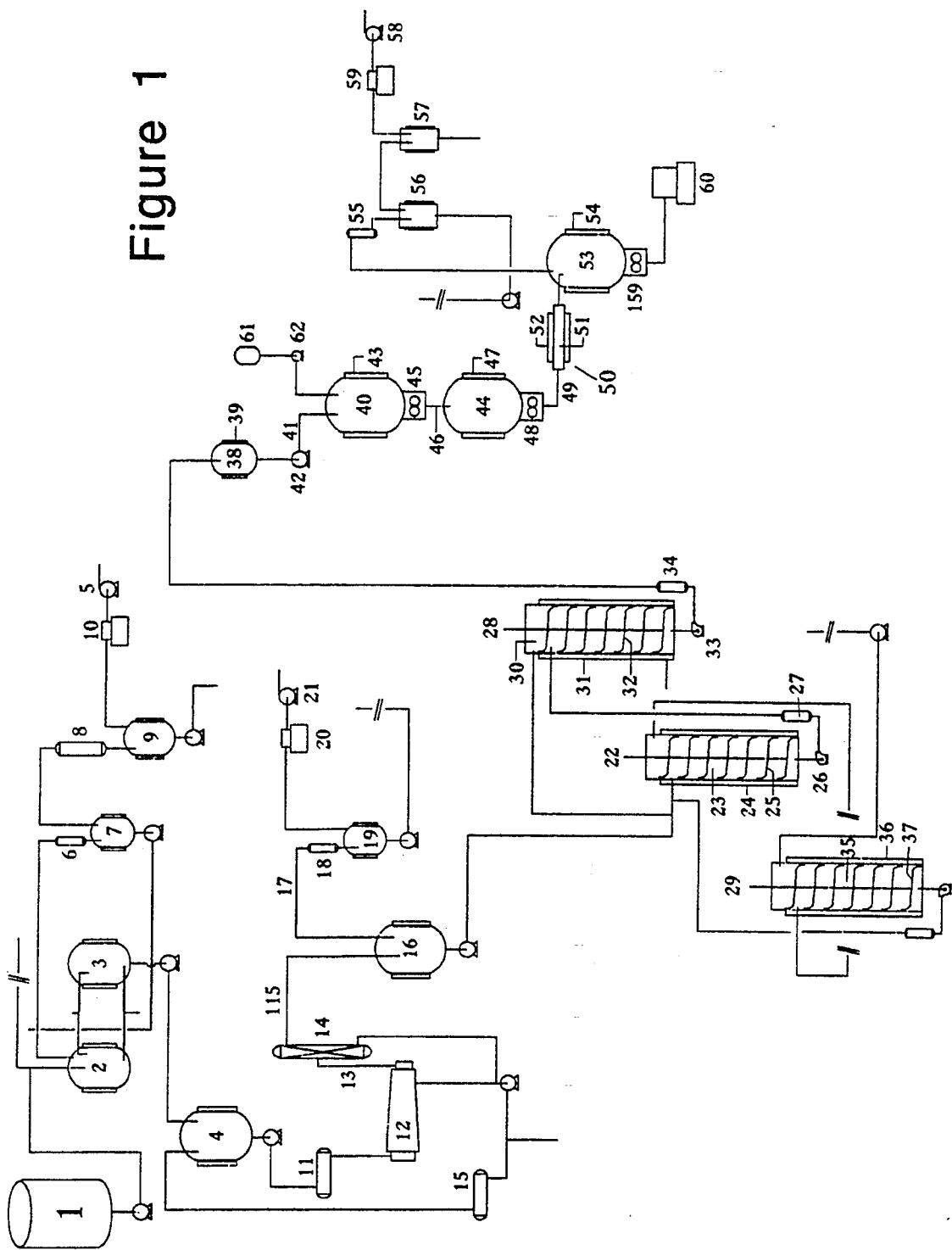
FIG. 1 is a schematic diagram of an integrated process according to the present invention.

The present invention will now be described in association with the drawings.

In a preferred continuous process of the present invention a reservoir 1 containing concentrated lactic acid, preferably more than 60 most preferably more than 80, most preferably about 85–90% lactic acid in water, feeds at least one continuous stirred tank reactor (CSTR) 2. Preferably there is at least a second CSTR 3 in series with the first CSTR to provide a feed of low molecular weight polylactic acid to a holding tank 4. The holding tank shown in the figure is heated to keep the contents in a molten state.

Typically, CSTR's 2 and 3 are operated at different temperatures from 115° to 125° C. to remove free water from lactic acid in reactor 2, and from 170° to 175° C. in reactor 3, to start to condense lactic acid to low molecular weight lactic acid. The apparatus is maintained under nitrogen. Optionally a vacuum is applied to aid water removal by a vacuum pump 5. Preferably the vacuum will be sufficiently low to remove water with minimum degradation of the monomer and polymers. Suitable vacuum pressures are less than 50, preferably less than 15, most preferably less than 8 mm of Hg. The preferred residence time is from 3 to 10 hours, preferably from 5 to 8 hours to produce a polylactic acid having a molecular weight from about 500–800.

The overhead vapours from the CSTR contain water, lactic acid and linear oligomers of lactic acid. The overhead vapours are drawn through the system by vacuum pump 5. The vapours pass through a condenser 6 to condense mostly lactic acid and oligomers. The melting points for L-Lactide, M-Lactide and Lactic Acid are 96.5° C., 65° C., and 18° C., respectively. The eutectic points are as follows:

| | |
|---|---|
| A: $XL = 0.34$ | $T = 44.6°$ C.; |
| B: $XL = 0.13$ | $T = 8.9°$ C.; and |
| C: $XM = 0.23$ | $T = 3.7°$ C. | wherein XL and XM are as described above. The condensate from condenser 6 passes to holding tank 7. Holding tank 7 itself is also under vacuum and mainly water and a small amount of lactic acid per se is drawn off. These vapours then pass through condenser 8 and are collected in holding tank 9. Some small amounts of vapours are drawn off from holding tank 9 and to protect vacuum pump 5 these are collected in a cold/alkaline trap 10. The lactic acid and oligomers collected in holding tank 7 are recycled to reactor 2. The material collected in holding tank 9 is purged.

Alternatively, CSTR's 2 and 3 can be operated in parallel in batch mode. In that case, the contents in reactors 2 and 3, lactic acid, is first raised to 115° to 125° C. to remove free water and then to 170° to 175° C. to form low molecular weight polylactic acid over a total residence time of 3 to 10, preferably 5 to 8 hours to produce polylactic acid having a molecular weight from 500 to 800.

Holding tank 4 serves mostly to provide a continuous feed of low molecular weight polylactic acid and catalyst to the process. The tank may be heated at temperatures up to at most 100, preferably from about 75° to 90° C. and is under vacuum typically of less than 15, preferably less than 8 mm Hg. Holding tank 4 feeds the low molecular weight polylactic acid to a heat exchanger 11. The heat exchanger 11 raises the temperature of the feed to from 50 to 120, preferably from about 85° to 110° C. The heated feed then travels to reactor 12. In the figure reactor 12 is indicated as a thin film reactor however other types reactors could be used.

In reactor 12 there is in equilibrium a mixture of polylactic acid having a molecular weight from about 400 to 5,000, linear oligomers of lactic acid, lactide, lactic acid, and water. The purpose of reactor 12 is to favour the conversion of low molecular weight polylactic acid to lactide. Optionally, there may be added to the equilibrium mixture from about 5 to 15 weight % based on the weight of the polylactic acid feed of a $C_{2-4}$ alkylene glycol having a molecular weight of less than 10,000. A preferred polyalkylene glycol is polyethylene glycol. The reaction mass also contains a catalyst selected from the group consisting of tin metal or tin oxide and tin esters of $C_{1-8}$ carboxylic acids. Typically the catalyst is present in an amount from 0.01 to 0.8, preferably from 0.05 to 0.25 weight % based on the weight of the equilibrium mass or mixture.

Reactor 12 is maintained at a temperature of 105° to 225°, preferably 200° to 215° C. Inside reactor 12 several reactions take place. There is an equilibrium between the formation of polylactic acid and depolymerization of polylactic acid. There is the formation of lactide and there is the vaporization of water, lactic acid, lactide, and low boiling linear oligomers of lactic acid. The overhead vapour leaves reactor 12 by line 13. Preferably, line 13 is heated to a temperature to within 5° or at most 10° C. of that in the reactor 12. The liquid phase leaving reactor 12 is mainly low molecular weight polylactic acid (MW from about 2,000 to about 8,000). This stream may be recycled to polylactic acid feed in holding tank 4 or purged.

Line 13 opens into a distillation column 14 which may optionally be packed and, at its inlet end has a temperature about 5° to 10° C. below that of reactor 12 and at its exit has a temperature in the range of from 85° to 100° C. As the vapour travels up distillation column 14 for the most part the higher boiling oligomers of lactic acid condense and may then be returned to reactor 12 or with the bottoms from reactor 12 to holding tank 4. Typically the return oligomers are cooled in a heat exchanger 15 prior to being returned to holding tank 4 to limit resident time at high temperature and resulting racemization.

The lactide, low boiling oligomers of lactic acid, lactic acid and water exit column 14 and travel through line or pipe 115 which is preferably heated to a receiving tank 16. The receiving tank 16 is jacketed and is maintained at a temperature front 70° to 100°, preferably from 80° to 95° C. The lactide and a small amount of water, lactic acid, and low boiling oligomers of lactic acid condense in receiving tank 16. The majority of the water and lactic acid exit column 14 and line 115 will also exit receiving tank 16 with some lactide, by an overhead line 17 and travel through a condenser 18 to a second receiving tank 19 operated at least 20, preferably 35° to 40° C. cooler than first receiving tank 16. Most preferably the second receiving tank 19 is operated at room temperature. The low boiling oligomers of lactic acid will form in tank 19 as a result of equilibrium reactions among lactic acid, lactide and water. The material in tank 19 may be purged or recovered by melting or liquifying with water and recycling to CSTR 2 or 3 to produce low molecular weight polylactic acid.

By controlling the temperatures in tank 16, line 17, condenser 18, and tank 19, about 5 to 10 weight % of the distillate from column 14 containing a major portion of the water and lactic acid will be trapped in tank 19.

The system from heat exchanger 11 through second receiving tank 19 is under a vacuum of less than 15, preferably less than 8 mm Hg. A cold/alkaline trap 20 is in the overhead line from second receiving tank 19 to vacuum pump 21 to protect vacuum pump 21 from any lactic acid which might come over from second receiving tank 19.

Typically, in receiving tank 16 the crude lactide comprises from 0.1 to 10.0% of carboxylic acid (e.g. not in the form of the cyclic dimer) and from 0.05 to 1.0 weight % of water. Typically to obtain polylactic acid having a molecular weight in the range from 20,000 to 300,000, preferably from 50,000 to 200,000 by ring opening polymerization of lactide, it is necessary to start with a lactide having a considerably lower content of such impurities.

Figure 2:
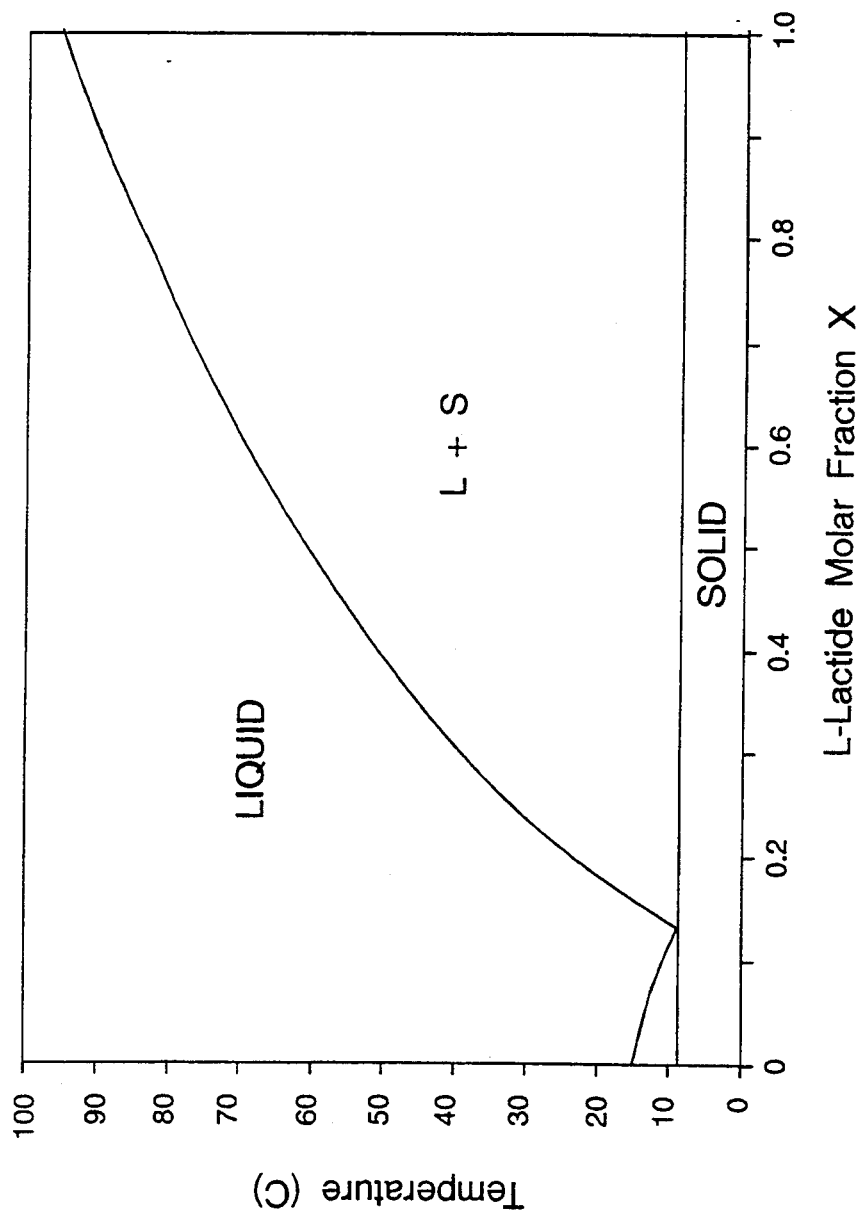
FIG. 2 is a phase diagram of the l-lactide/lactic acid solid liquid equilibrium.
Figure 3:
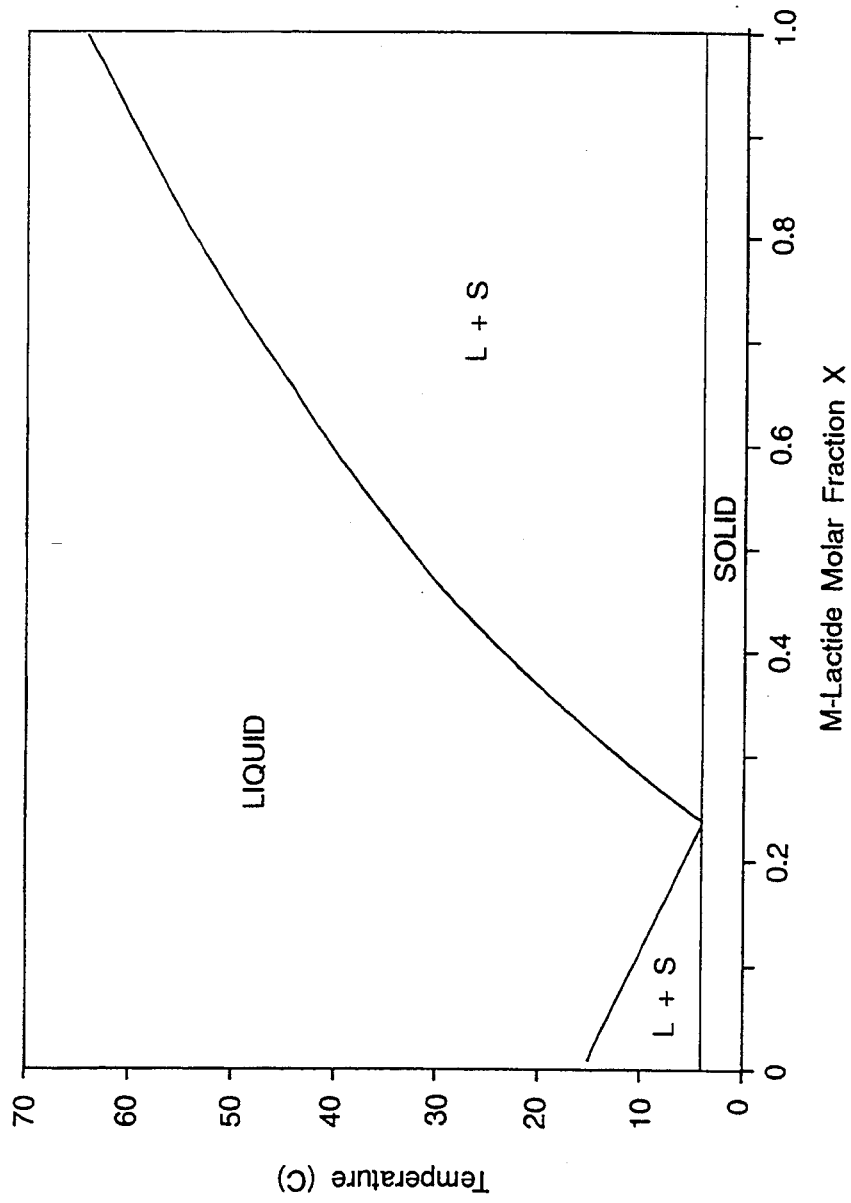
FIG. 3 is a phase diagram of the m-lactide/lactic acid solid liquid equilibrium.
Figure 4:
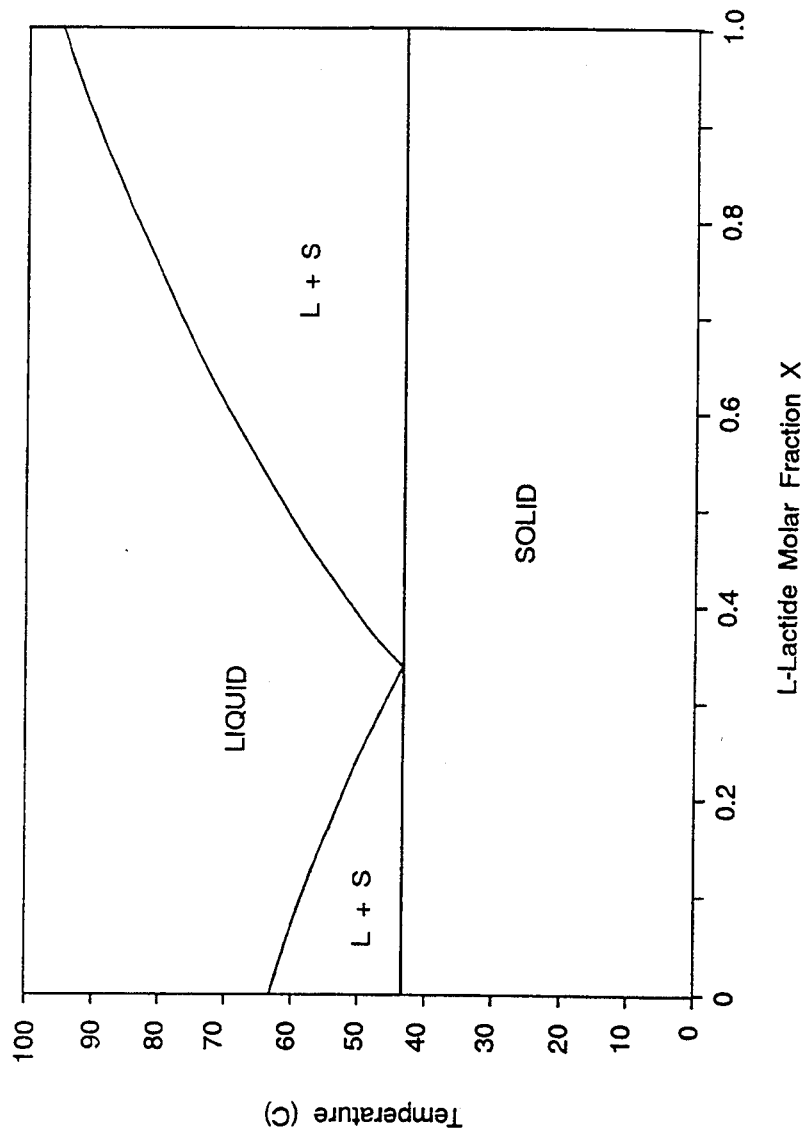
FIG. 4 is a phase diagram of the m- and l-lactide solid liquid equilibrium.
Figure 6:
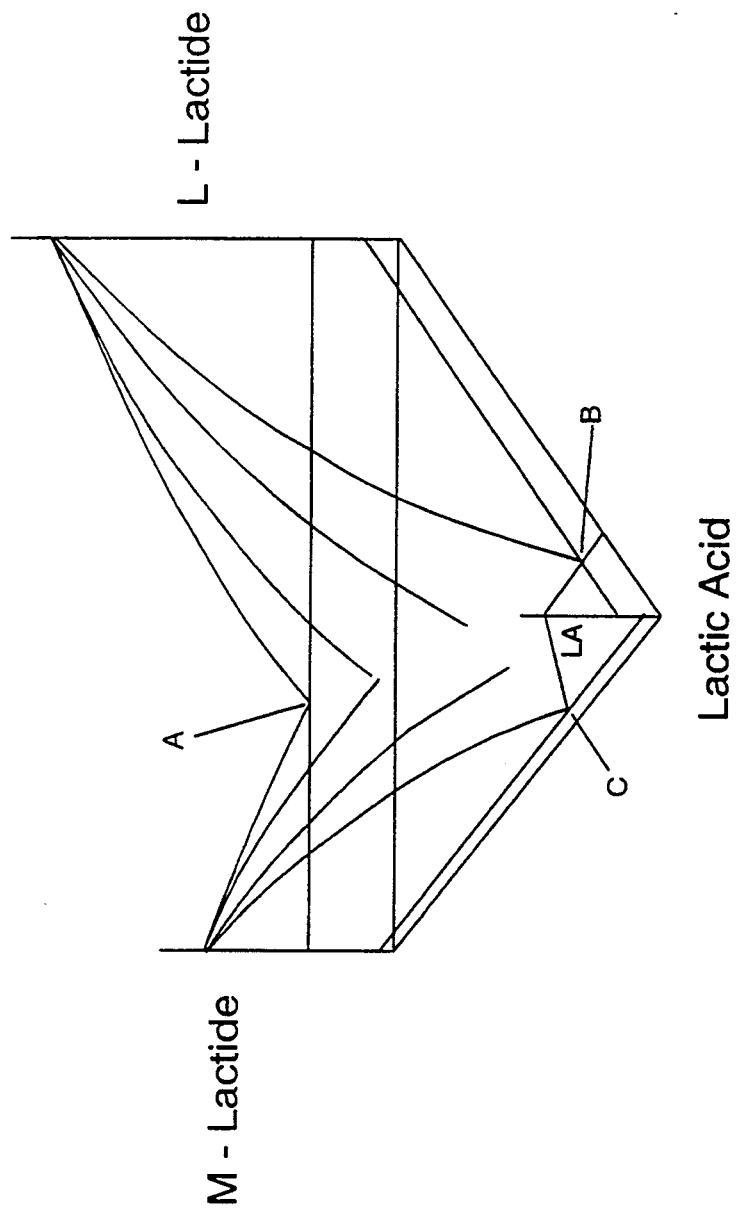
FIG. 6 is a phase diagram derived from Van'T Hoff's Equation for the three component system comprising l-lactide , m-lactide and lactic acid which shows contours for the solid liquid equilibrium and the eutectic points for the three two phase mixtures (e.g. m-lactide and lactic acid; l-lactide and lactic acid; and m-lactide and l-lactide as C, B, and A respectively) and the mole fraction of the lactide of the specified configuration (e.g. XL is mole fraction of l-lactide and XM is mole fraction of m-lactide).

The principle of melt recrystallization is best described by referring to FIGS. 2 through 4 which are liquid solid phase diagrams derived from Van T'hoff's equation and FIG. 6 which is a three dimensional representation of the contour surfaces for the liquid solid equilibrium for three component systems or mixtures indication concentration of components and temperature. The Figures show the liquid/liquid-solid (L+S)/and solid equilibriums for lactic acid, l-lactide, m-lactide and l,m-lactide (mixtures). While in some instances it may be desirable to use 100% pure m- or l-lactide typically the lactide polymerized will be a mixture of lactide having different configurations. The melt recrystallization aspects of the present invention seek to provide a purified lactide stream having a useful l-, m-ratio. In some cases there is a need to reduce the m-isomer. The m-isomer may, however, be present in the lactide in an amount from about 0.0 to 30.0, preferably from 0.5 to 25 weight %. Once the weight % or mole fraction of m-isomer permissible in the lactide mix is known or selected FIG. 4 will be used to determine the upper temperature limit of the recrystallization step. FIGS. 2 and 3 taken together show that with each recrystallization at a higher temperature more of the M-isomer will be removed from the solid phase (assuming that the composition is to the right of the eutectic point). From FIGS. 2, 3, and 4 suitable temperatures for the process can be selected.

Location of a system on the phase diagrams relative to the eutectic point is a function of the composition of the crude lactide stream. To be on the left side of the eutectic point, one would have to start with a composition which contained greater than about 65 weight % of m-lactide. The typical composition of crude lactide coming from receiving tank 16 should have a ratio of l to m isomers from about 80:20, more preferably 90:10. Through each purification step the solid lactide or liquid solid slurry of lactide becomes richer in l- isomer and the liquid phase becomes leaner. Accordingly, in each step going up in purity (of l-isomer) the composition is moving more to the right of the eutectic point.

A continuous crystallizer consists generally of a vessel which is fitted with a cold surface. Typically the crystallizer will comprise one or more vessel in a series. Generally the temperatures in the recrystallizers may be from 45° to 90°, preferably from 65° to 80° C. The product to be treated, in this case crude lactide having a l-, m-ratio from about 80:20 to 90:10 is heated to form a melt above the melting point of a lactide mixture having a targeted l,m ratio. The cool surface is held at the temperature to yield the desired composition of product. The compositions which are solid at that temperature form crystals or in some cases a slushy mass on the cool surface. Compositions which contain, in this case sufficient m-isomer remain liquid. The solid or slush, is removed from the cool surface, typically by a scraper or other suitable mechanical means. The specific gravity of the solid phase is higher than that of the (uncrystallized) liquid phase. Thus after being removed from the cool surface this solid material sinks to the bottom of the recrystallizer. The solid phase is then pumped to zones of higher temperature increasing the purity (or richness of the l-isomer) of the solid phase. The liquid phase travels counter current to and often over the solid phase to extract any impurities, to zones of lower temperature, and in this case lower purity. Multiple crystallizers of this type can be arranged in series to provide the required purification of the crude lactide from first receiving tank 16. One possible arrangement is shown schematically in the drawings.

The crude lactide melt from first receiving tank 16 is fed to first recrystallizer 22. First recrystallizer 22 comprises a hollow cylinder 23 and a cooling jacket 24. A coolant at T2, in this case say 80° C. is circulated through cooling jacket 24. A lactide mixture containing about 0.80 to 0.90 mole fraction of l-isomer condenses or crystallizes on the inside of the cylinder 23 (see FIG. 5). The liquid fraction within cylinder 23 contains the remaining m-lactide, l-lactide, and other impurities because it won't crystallize out at that temperature, (see FIG. 4). The crystals are scraped off the interior of cylinder 23 by rotary scrapers 25 and precipitate through a solution of crude lactide melt. The crystals from the bottom of recrystallizer 22 are pumped by pump 26 through a heat exchanger 27 where they are heated to about 90° C. The melt then enters a second recrystallizer 28 operated at 90° C. The effluent from the top of recrystallizer 22 passes to a cooler recrystallizer 29.

Recrystallizer 28 comprises a hollow cylinder 30 and a heat jacket 31. A coolant (heatant) circulates through heating jacket 31 to maintain the temperature within the cylinder at 90° C. Crystals of m-l lactide will form on the walls of cylinder 30. The crystals will have an l-isomer content of upwards of 0.90 mole % (see FIG. 3). The crystals are scraped off the walls by rotary scrapers 32 and precipitate through a solution of relatively less crude lactide. As the crystals precipitate they sweat and lose impurities. The proper mole percent of l-isomer is maintained in the crystals. It should be noted that small occlusions of m-isomer may be lost as the crystal falls through the solution. The crystals which precipitate to the bottom of recrystallizer 28 are pumped by pump 33 through heat exchanger 34 to one or more reactors. In the alternative the crystals could be collected as solid lactide which could later be melted and used in reactors.

The effluent from the top of recrystallizer 22 may be recycled back to a cooler recrystallizer 29. Recrystallizer 29 comprises a hollow cylinder 35, and a cooling jacket 36. The coolant in this recrystallizer is maintained at a temperature of about 70° C. The crystals formed on the interior of cylinder 35 will have a higher content of m-isomer (about 0.6 mole %). The crystals are scraped off the interior wall of the cylinder by rotary scraper 37. The crystals may be returned to the feed to recrystallizer 22 or to reactor 2 or may be collected as solid lactide. In a further optional embodiment prior to returning the product of recrystallizer 29, to recrystallizer 22 it may be passed through a centrifuge to separate it into a solid fraction of higher purity and l-isomer content. The solid fraction may be blended with the crude lactide and fed to recrystallizer 22. This procedure may be applied to any bottom recycle stream. Similarly the effluent from a recrystallizer (rich in lactic acid) may be returned to reactor 2.

In an alternate embodiment of the invention a single stage dedicated rectification column, of larger size could be added to treat the effluent from the last recrystallizer prior to polymerization.

The polymerization of purified lactide will now be described. This process is essentially as described in U.S. patent application Ser. No. 659,567 filed Feb. 22, 1991 in the names of Gregory B. Kharas, Israel D. Fridman and Speros P. Nemphos assigned to Polysar Financial Services S.A. (subsequently renamed Novacot Chemicals (International)S.A.)

The purified lactide melt is fed into a prereactor 38 which is a vessel having a heating jacket 39. The vessel may be heated by oil or steam or pressurized water maintained at initial temperature T1. The vessel is heated to above the melting point of the lactide mixture to be polymerized. Typically the temperature will be from about 125° to 150° C. The lactide may be fed to the prereactor in the form of a solution or suspension, but in the present invention may also be in the form of a melt. If the monomers are in the form of a solution the concentration of monomers in solvent or diluent should be as high as practicable, and preferably not less than about 85% by weight. There are a number of suitable diluents or solvents including $C_{6-12}$ aromatic solvents, $C_{6-12}$ alkanes which are unsubstituted or substituted by a $C_{1-4}$ alkyl radical, and $C_{1-6}$ alkyl ketones. Suitable aromatic diluents include ethyl benzene and toluene. Suitable $C_{6-12}$ alkanes include hexane and ethyl hexane. Suitable $C_{1-6}$ ketones include acetone.

The prereactor 38 is joined to the first reactor 40 (preferably in a chain of two or more reactors) by a heated line 41 maintained at constant temperature. The lactide melt is pumped to the first reactor 40 by pump 42. The pump is also heated to maintain a constant temperature of at least T1. The heating means on the pump 42 and line 41, may be any suitable means such as an electric heating line steam line or hot oil and preferably controlled independently.

If the purification step is by solvent extraction using organic solvents, the purified crystals would be recovered and dried mechanically in a suitable drier including for example a two phase direct contact drier such as a tumble drier, a fluidized drier, and a ribbon drier. The dried crystals could be fed directly to reactor 40. However, it should be noted that such a feed device should be equipped with water cooling capability to avoid premature melting of incoming monomer. Premature melting could lead to monomer feed blockage. In the alternative the lactide crystals could be premelted and pumped (metered) into reactor 40. Preferably, the purified lactide is used in the form of a melt.

Reactor 40 and also the subsequent reactors may typically be a stirred vessel, such as a continuous stirred tank reactor, capable of operating at reduced and elevated pressure and temperatures up to about 250° C. The reactor configuration may be spherical, cylindrical or tubular. The agitator may be of any suitable type for the reactor including turbine, anchor, paddles and screw conveyor, or combinations thereof, such as an axial flow turbine in combination with peripheral anchor(s) or anchors in combination with peripheral a single or double helix ribbon.

In a preferred, optional, embodiment a catalyst is used to increase the rate of reaction. A wide range of catalysts are suitable to promote the rate of the reaction. The catalyst may be an acid cation exchange resin, acid clay, activated clay, bentonite, alumina, or an aluminum complex of the formula $Al(O-R)_3$ where R is a $C_{2-6}$ alkyl radical, talc, silicic acid, metal complexes of the formula $R_1MR_2$ wherein $R_1$ and $R_2$ independently may be selected from the group consisting of $C_{1-18}$, preferably a $C_{5-10}$ carboxy radicals, an oxygen atom, a halogen atom, and M is a Group II or IV metal atom. Preferably M is selected from the group consisting of magnesium, calcium, tin and lead. Preferably, $R_1$ and $R_2$ are the same and are $C_{5-10}$ carboxyl radicals. Particularly useful catalysts include stannous octoate and the aluminum complex $Al(O-R)_3$. Such aluminum complexes are disclosed in H. R. Dricheldorf Macromolecules Volume 21, No. 2 p. 286 (1988).

The catalyst may be added to the first and/or any subsequent reactor. In the drawing a catalyst vessel is shown at 61. The catalyst may be used as a dilute solution, suspension, or in undiluted form. Typically the catalyst may be used in an amount from 0.005 to 0.5, preferably from 0.015 to 0.1 weight % based on the weight of the lactide. The catalyst vessel is connected to the first reactor by a line 33 and a pump 62. As noted above, the catalyst vessel need not be only connected to the first reactor. It may be connected to one or more subsequent reactors.

The lactide and catalyst are fed to the first reactor 40. The first reactor 40 has a jacket 43 which may be heated by steam or hot oil or pressurized hot water to a temperature T3. The reactor is operated at temperatures from about 150° to 225°, preferably from 175° to 200°, most preferably about 175° C. and at a pressure from about 0.5 to 5.0, preferably about 1.0 atmospheres pressure. Typically, the reactor is a stirred tank reactor. That is there is agitation in the reactor using typical systems as described above.

The lactides and optional catalyst are kept in the first reactor 40 for a period of time to permit a conversion from about 35 to 85% depending on the number of reactors in the chain. Typically, the conversion of monomer to polymer coming out of the first reactor should be from about 50 to 80%. The residence time in the first reactor should be from 1 to 3 hours depending on the size of the reactor and the rate of feed to the reactor.

The polymer melt is pumped from the first reactor 40 to the second reactor 44 by a pump 45 through a heated or insulated line 46 maintain at T3. The second reactor 44, like the first reactor 38 also has a jacket 47 and is maintained at T4. The second reactor 44 is operated at temperatures from 150° to about 250°, most preferably from about 185° to 200° C.

The polymer melt is held in the second reactor for a period of time from about 1 to 3 hours to bring the conversion up to from about 75 to 95, most preferably from 90 to 95%.

The polymer melt is then pumped from the second reactor 44 by a pump 48. In the embodiment shown in the drawing the polymer melt is pumped through line 49 to reactor (or preheater) generally shown at 50. The reactor is preferably a tube 51 and shell 52 type heat exchanger schematically shown in the drawing. Reactor 50 may comprise a single pass tube in shell heat exchanger with static mixers for a more uniform product; or an extruder-type device if additional pressure is required. The shell enclosing the tubes through which the polymer melt passes is hated and maintained at a temperature of T3 using suitable heating means such as electric heaters, hot oil, water or steam.

The preheater is heated to temperatures up to about 250° C. More typically the preheater will be heated to from about 180° to 210° preferably from 190° to 200°, most preferably about 200° C. The residence time of the polymer melt in the preheater may range from about 5 to 15 minutes. Preferably the time is kept as short as possible to minimize polymer degradation and/or depolymerization. The pressure in the preheater should range from about 0.1 to 1.5 typically about 0.5 atmospheres.

Generally, the polymer melt exits the reactor or preheater 50 directly into the upper end of devolatilizer 53 which may have a heating jacket 54. Devolatilizer 53 is operated at a temperature T6 from about 150° up to about 225°, preferably from about 200° to 220° C. The internal pressure in devolatilizer 53 is below atmospheric, typically less than about 0.02, most preferably less than about 0.01 most preferably less than about 0.005 atmospheres. While the embodiment in FIG. 1 shows only one devolatilizer the devolatilizer may comprise a series of two devolatilizers as are disclosed in a number of patents in the name of Monsanto. The devolatilizer may be a falling strand devolatilizer. That is the polymer melt falls as strands from the top to the bottom of the devolatilizer. As the polymer descends to the bottom of the devolatilizer the unreacted monomer and diluent evaporate from the polymer and are withdrawn from the devolatilizer. Depending on the polymer viscosity and the level of unreacted monomer polymer distributors may be used. For example, the polymer melt could be held in a subatmospheric chamber for longer periods of times by using a buffer or catcher tray, such as those disclosed in U.S. Pat. No. 5,069,750 in the name of Polysar Financial Services S.A. A further alternative could be to use an extruder type devolatilizer equipped with a single or multi-stage vacuum apparatus to achieve vacuum levels as low as 0.002 atmospheres. Also a suitable carrier solvent such as nitrogen, toluene, ethyl benzene etc, may be used as a nucleating agent and to aid in reducing the partial pressure of unreacted lactide monomer. This would be beneficial in trying to reduce the final level of lactide monomer in the finished product.

Yet another approach could be to use thin film (wiped-film) evaporators where the combination of shorter dwell times, high ratios of surface area to volume and reduced shear rate is of benefit to the properties of the finished product.

A further suitable devolatilizer may comprise a shear field with a vacuum. Typically this could comprise an extruder, preferably a twin screw extruder having one or more vacuum ports. Such a devolatilization process is described in U.S. patent application Ser. No. 757,923 filed in the names of Michael Castriotta, Israel Fridman, James Lunt, James Makuc, and James T. McQueen, assigned to Novacor Chemicals (International) S.A. the text of which is incorporated herein by reference.

The volatiles from the devolatilizer pass to a condenser 55. Downstream from the condenser may be various traps to remove material from the overhead stream from devolatilizer 53. In FIG. 1 two traps are shown as 56 and 57. Intermediate the last trap 57 and the vacuum pump 58 is a cold trap 59 to remove the last residuals from the vapour removed from the devolatilizer.

The condenser may comprise one or more stages or zones at different temperatures to more completely condense the volatiles and to possibly separate the volatiles into different fractions.

The devolatilization may also be achieved by using thin film separators and by changing or increasing the amount of carrier, diluent or solvent.

The resulting polymer may then pumped from devolatilizer 53 by a pump 159. Typically the polymer is extruded as strands and cooled and fed to a pelletizer 60 where it is chopped into pellets which then may be moulded, extruded, blown or thermoformed into various articles.

The present invention has been described in terms of the manufacture of polylactic acid. Lactide may be polymerized with a number of other monomers to produce copolymers. For example, purified lactide could be copolymerized with other hydroxy carboxylic acids such as glycolic acid, or lactones or lactams such as valerolactone. Additionally, it should be remembered that lactide may have various configurations. The lactide may be all d- or all l- or it may be a meso lactide. The ratio of these ingredients in any mixture will affect the physical properties of the resulting polymer. The present patent application is not intended to be limited only to lactide homopolymers. From a practical point of view one or more comonomers would be added with the purified lactide to reactor 40.

In accordance with the present invention the various steps may be conducted batch wise or continuously. From a practical point of view it is preferable to conduct an integrated continuous process. However, there may be circumstances where it would be desirable to conduct one or more of the steps in the process of the present invention as batch steps.

The present invention will now be illustrated by the following examples. Much of the experimental work was done using laboratory equipment. Various stages of the process were carried out using laboratory scale or pilot plant equipment, continuously or batch wise as a single process step to demonstrate the feasibility of using such technology on a continuous scale.

EXAMPLE 1

Production of Low Molecular Weight Polylactic Acid 1662 grams of heat stable lactic acid, in the form of an 88 weight % aqueous solution were supplied to a 2.0 liter 316 stainless steel stirred Parr reactor. The contents were purged with nitrogen and a nitrogen stream was continuously passed through the reactor during the reaction. The contents of the reactor were agitated and initially heated to 120° C. to remove the water from the reactor. The contents of the reactor were then heated to 175° C. and held there for 7 hours. After this time the contents were drained from the reactor. The reaction product was polylactic acid having a number average molecular weight of 719. The yield was 92%.

Laboratory Reactor Set up to Produce Crude Lactide

Figure 5:
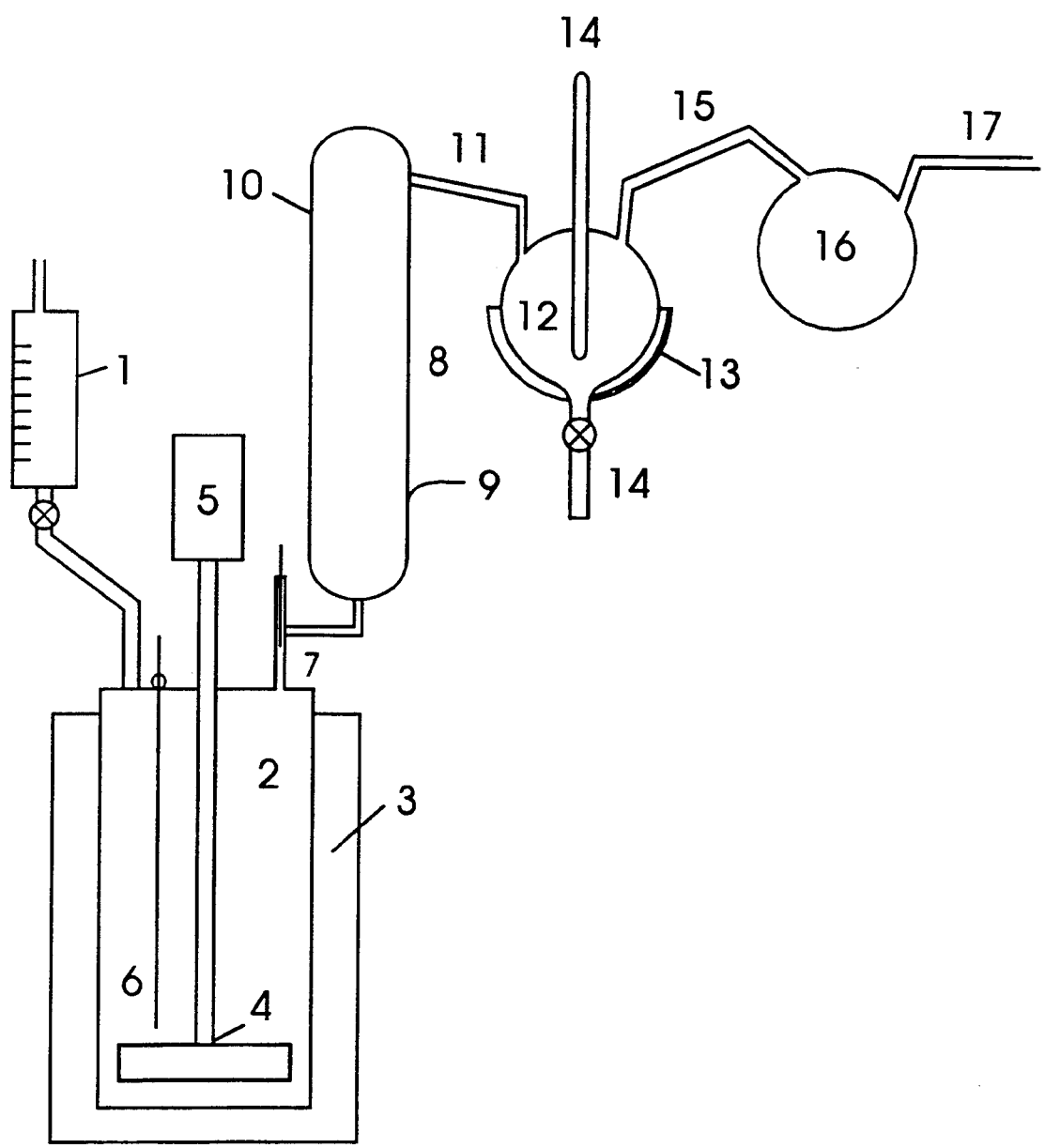
FIG. 5 is a schematic diagram of a laboratory apparatus to carry out the process of the present invention to produce crude lactide feedstock.

All reactions to continuously produce crude lactide were performed in a fume hood using common 24/40 laboratory glassware assembled in a configuration according to FIG. 5.

In FIG. 5 a graduated feed funnel 1, provides a feed of molten low molecular weight polylactic acid to reactor 2. Reactor 2 has a heating jacket 3, a stirrer 4, driven by an electric motor 5 and a thermocouple 6. Not shown in the diagram is the temperature control unit to maintain the temperature of the melt of low molecular weight polylactic acid. The distillate from reactor 2, leaves the reactor by vent 7. There is a thermocouple at vent 7 to precisely control/maintain the temperature at the vent. Not shown in the drawing is the temperature control unit and the electrical heating wrap around vent 7. Vent 7 leads to a condenser 8.

Condenser 8 has a lower and upper thermocouple 9 and 10 respectively. Not shown in the drawing is the temperature control unit and the electrical heating wrap around condenser 8. The distillate leaves the condenser by vent 11 which feeds a first receiving tank 12. Receiving tank 12 has a heating jacket 13 and a thermometer 14. Not shown in the drawing is the temperature control unit. Additionally, receiving tank 12 has a stop cock 14 to withdraw crude lactide from the tank. Receiving tank 12 is heated to drive off low boiling oligomers and water along with some lactide which leave the tank by vent 15 and enter second receiving tank 16 which is at room temperature. Vent 17 from second receiving tank 16 leads to a vacuum pump not shown.

In operation, an equilibrium mixture of lactic acid and low molecular weight polylactic acid is fed to and kept in feed funnel 1. The feed funnel is maintained at a temperature to keep the mixture liquid. Reactor 2 is kept at a temperature from 190° to 225 ° C. For best results the residence time in reaction vessel 2 should be under 3 hours. Longer residence times produced a greater quantity of meso lactide and D,L-lactide.

The distillation column should be operated at a lower column temperature from 130° to 140° C. and an upper common temperature from 125° to 130° C. First receiving vessel 12 is maintained at a temperature of from about 85° to 100° C. Second receiving vessel 16 is maintained at about room temperature. Vent 17 leads from second receiving vessel to a vacuum pump to maintain the pressure within the apparatus at less than 15, preferably about 8 mm Hg. During operation if there are problems with lines clogging with lactide and/or polylactic acid a heat gun may be used to melt the lactide and/or polylactic acid. As crude lactide is withdrawn from first receiving vessel 12 new low molecular weight polylactic acid is added to reactor 2. In this manner the distillation/formation of crude lactide need not be interrupted.

In the following examples unless otherwise indicated % is weight %, and parts are parts by weight.

EXAMPLE 2

Continuous Production of Crude Lactide

The above described laboratory equipment was charged with 400 grams of molten low molecular weight polylactic acid at 150° C., prepared by the dehydration of aqueous lactic acid. The low molecular weight polylactic acid had a molecular weight of 850 determined by end group titration. In addition to the low molecular weight polylactic acid were added 0.1970 gram of SnO, catalyst, and (optionally) 40 gram of polyethylene glycol having a molecular weight of 10,000. The vacuum was lowered to 5 mm Hg and reactor 2 was heated to 210° C.

Each time a 50 ml volume of crude lactide was distilled over a further 50 ml of molten low molecular weight polylactic acid was added to reactor 2 to maintain a volume of 400 ml in reactor 2. Molten crude lactide was collected in first receiving vessel 12 and maintained at a temperature from 85° to 100° C. Low molecular weight oligomers (linear oligomers such as dimers, trimers and other higher linear oligomers of lactic acid) and water were distilled over along with some lactide to second receiving vessel 16. The distillation and production for crude lactide was carried out continuously for 6.5 hours producing about 96 gram per hour.

The molten crude lactide was water-white, and found to contain 5.0% total carboxylic acid Coy titration), calculated as % lactic acid; 4.1% lactic acid (by GC analysis), 5.5% meso lactide Coy Gas Chromatagraph (GC) analysis), and 0.12% moisture (by titration). The product gave an optical rotation of $-250°$ (0.1 gram/millilitre in toluene at 25° C.). The total low boiling oligomer content in the crude lactide was 0.3% Coy GC analysis).

EXAMPLE 3

The distillation carried out in Example 2 was restarted. To the bottoms in reactor 2 were added an additional 0.2420 gram of SnO to bring the total to 0.4390 gram. The additional SnO caused the rate of the process to about double. Over a 7 hour period two fractions for 534 and 540 gram of crude lactide were collected. The product produced was comparable to the product produced by the second example.

Master Batch

The procedures of Example 3 were continued until a total production of 6.3 kg of crude lactide was obtained. All the samples of crude lactide were melt blended to produce a master batch. The master batch contains 3.0% total carboxylic acid, calculated as lactic acid (by titration); 2.5% of lactic acid (by GC); 10.9% meso lactide Coy GC); 0.34% total low boiling oligomers (by GC); and 0.15% water (by titration).

Table 1 sets forth the analysis of individual runs of the reactor to produce crude lactide.

TABLE 1

| | | | Lactide Results | | | | |
|---|---|---|---|---|---|---|---|
| Fraction | Sample | Free Acid | % Lactic Acid | % Meso | % D + L | Rate gram/hour | Optical Rotation |
| 1 | 353-9-1 | 5.0 | 4.1 | 5.5 | 90.0 | 82 | −250 |
| 2 | 353-10-1 | 4.3 | 2.3 | 7.3 | 90.0 | 153 | −245 |
| 3 | 353-10-2 | 4.3 | 1.7 | 8.5 | 89.5 | 180 | −245 |
| 4 | 353-11-1 | 2.3 | 1.5 | 7.5 | 89.8 | 167 | −238 |
| 5 | 353-11-2 | 2.0 | 1.6 | 7.0 | 91.0 | 179 | −250 |
| 6 | 353-13-1 | 4.1 | — | — | — | — | −210 |
| 7 | 353-13-2 | 2.8 | 2.8 | 11.1 | 85.8 | 240 | −230 |
| 8 | 353-13-3 | 2.2 | 1.7 | 7.6 | 90.4 | 239 | −250 |
| 9 | 353-14-1 | 1.6 | 1.4 | 9.6 | 86.7 | 210 | −245 |
| 10 | 353-14-2 | 1.1 | 1.5 | 10.7 | 89.6 | 201 | −250 |
| 11 | 353-14-3 | 0.5 | 0.4 | 10.5 | 89.0 | 196 | −240 |
| * | 353-14-4 | — | 15.6 | 14.5 | 69.4 | 20 | −250 |

*cumulative content in receiver

EXAMPLE 4

Purification of Crude Lactide - Static Experiment

A sample of crude lactide was melt crystallized in a single stage static method (e.g. a simple tube). A melt of crude lactide at a temperature of about 80° C., was maintained in a tube and purer lactide crystallized out on the side of the tube. The liquid residue and the relatively purer crude lactide crystals were analyzed. The results are set forth in Table 2.

TABLE 2

Melt Crystallization of Crude Lactide

| Component | Untreated Crude 331-65 | Liquid Phase 332-12-C | Solid Phase 332-12-D |
| --- | --- | --- | --- |
| M (%) | 4.5 | 9.0 | 5.8 |
| L, D (%) | 91.5 | 89.9 | 93.4 |
| Lactic Acid (%) | 0.47 | 1.26 | 0.85 |
| Oligomers (%) | 3.0 | 1.3 | 0.8 |
| Water (ppm) | 2950 | 920 | 930 |

The results are ambivalent. There appears to have been some hydrolysis and racemisation during the process. However, the amount of oligomers and water in the "purer" crude lactide were significantly reduced. Given the unsophisticated procedure the results were sufficiently promising to warrant a further attempt using a dynamic apparatus.

EXAMPLE 4

Purification of Crude Lactide - Dynamic Experiment

A melt of crude lactide was maintained in a rotary evaporator at a temperature of 84° C. In the rotary evaporator the lactide crystals condensed out on the sides of the evaporator. The crystals were in a melt of less pure lactide. The liquid phase was removed. The impurities were "sweated" out of the more crystalline product at 87° C. At the end of the run the impure melt was separated from the more pure crystalline product. The untreated crude lactide, the liquid phase and the solid phase were analyzed. The results of the analysis are set forth in Table 3.

TABLE 3

| Component | Untreated Crude % | Liquid Phase % | Solid Phase % |
| --- | --- | --- | --- |
| M (%) | 16.55 | 30.96 | 3.45 |
| L, D (%) | 83.45 | 69.31 | 96.55 |
| Lactic Acid (%) | 8.43 | 12.27 | 0.88 |

These results show that using a fairly simple dynamic device it is possible to obtain about an order of magnitude reduction in impurities, and particularly in lactic acid per pass through a melt recrystallizer. Accordingly, it is apparent to one skilled in the art that a multi stage-melt recrystallizer would be a suitable device to significantly improve the purity of crude lactide in a continuous manner.

EXAMPLE 6

Continuous Polymerization of Lactide

A continuous polymerization of l-lactide was carried out using a pilot plant having a single CSTR reactor in a lay out as at the last part of FIG. 1. After reaching steady state in about 7 hours, the monomer melt was fed into the reactor at a rate of 10 lb/hour. The reactor was operated at 178° C. The reactor was a stirred tank reactor. A catalyst comprising stannous 2-ethyl hexanoate was fed to reactor at a rate of 1-1.5 gram/hour. Due to a mechanical problem the catalyst feed was 0.1% based on monomer. The target feed was 0.65% based on monomer. As a result the molecular weight of the resulting lactide polymer was low. The residence time in the first reactor was about 4 hours. The conversion in the reactor after reaching steady state was from 95.5 to 96%.

Due to the problem with catalyst feed the product exiting the reactor was sampled and conversion (gravimetric in an oven) was determined. As indicated the conversion was constant. The other variables including temperature, RPM of the stirrer, etc remained essentially constant, with in experimental error given the continuous nature of the process. The conversion result during start-up and while running are set forth in Table 4.

TABLE 4

Continuous Bulk Polylactide Process

| DATE | TIME | Conversion % SOLIDS (Oven method) |
| --- | --- | --- |
| 12/12/90 | 09:50 | 54.1 |
| 12/12/90 | 10:50 | 97.1 |
| 12/12/90 | 11:50 | 93.6 |
| 12/12/90 | 12:50 | 92.5 |
| 12/12/90 | 13:50 | 92.9 |
| 12/12/90 | 16.45 | 96.8 |
| 12/12/90 | 18:15 | 95.3 |
| 12/12/90 | 21:50 | 96.1 |
| 12/13/90 | 00:50 | 96.8 |
| 12/13/90 | 04:50 | 96.8 |
| 12/13/90 | 09:55 | 89.8 (*) |
| 12/13/90 | 12:00 | 95.5 |

Onset of Continuous operation: 17:00 hours on 12/12
End of Continuous operation: 13:30 hours on 12/13
TOTAL Continuous operation: 20:50 hours
(*) sample degraded during oven test.

The results show that lactide polymer may be produced by a discontinuous process. It is also apparent to one skilled in the art that the individual process steps could be combined to provide an integrated continuous process.

What is claimed is:

1. A process for the polymerization of polylactic acid comprising:
   (i) dehydrating aqueous lactic acid and polymerizing lactic acid by condensation to a molecular weight from 400 to 5,000;
   (ii) heating and reacting an equilibrium mixture comprising mainly polylactic acid having a molecular weight from 400 to 5,000, and small amounts of water, lactic acid, lactide and linear oligomers of lactic acid; depolymerizing polylactic acid to form lactide;
   (iii) distilling off a vapor phase comprising mainly lactide, lactic acid, linear oligomers of lactic acid and water;
   (iv) in a separate unit operation further fractionating the distillate from step (iii) into crude lactide and a distillate phase, comprising in addition to lactide, water, lactic acid, and linear oligomers, which is optionally recycled to step (I);
   (v) purifying the crude lactide by melt crystallization; and
   (vi) bulk or solution polymerizing the purified lactide.

2. The process according to claim 1, wherein in step (i) aqueous lactic acid is heated to a temperature of from 100° to 190 ° C.

3. The process according to claim 2, carried out under a vacuum to aid water removal.

4. The process according to claim 1, wherein in step (ii) said equilibrium mixture is heated to a temperature from 120° to 220° C. at a pressure of less than 15 mm of Hg.

5. The process according to claim 4, wherein said equilibrium mixture is heated at a temperature from 180° to 220° C. at a pressure of less than 10 mm of Hg.

6. The process according to claim 5, wherein there is added to the equilibrium mixture of step (ii) from about 5 to 15 weight % based on the weight of said reaction product of a $C_{2-4}$ alkylene glycol having a molecular weight of less than 10,000.

7. The process according to claim 5, carried out in the presence of a catalyst selected from the group consisting of tin metal, tin oxide and tin esters of $C_{1-18}$ carboxylic acids.

8. The process according to claim 6, wherein said first and second receivers are maintained at pressures less than 10 mm of Hg and the second receiver is maintained at about room temperature.

9. The process according to claim 8, wherein said first and second receivers are maintained at pressures of less than 8 mm of Hg.

10. The process according to claim 9, wherein there accumulates in said first receiver a mixture comprising mainly crude lactide and small amounts of water, lactic acid, and low boiling oligomers of lactic acid and there accumulates in the second receiver a mixture comprising mainly water and lactic acid, and some low boiling oligomers of lactic acid and lactide.

11. The process according to claim 10, wherein the contents of said second receiver are recycled to said equilibrium mixture.

12. The process according to claim 11, wherein in step (v) said crude lactide is purified by melt recrystallization.

13. The process according to claim 12, wherein said melt recrystallization is conducted using a series of at least two recrystallizers.

14. The process according to claim 13, wherein said recrystallizers are counter current recrystallizers.

15. The process according to claim 14, wherein the crude lactide is fed to one or more recrystallizers in a series and cooled to a temperature from 45° to 90° C. the crystallized product from any recrystallizer in said series except the last, being fed to an immediately subsequent recrystallizer, operated at a temperature at least 3° C. higher than said immediately prior crystallizer, the uncrystallized melt effluent from any recrystallizer in said series, except the first recrystallizer being returned to the immediately prior recrystallizer, the uncrystallized melt from said first recrystallizer being returned to step (ii), and the product from the last recrystallizer being passed to step (vi).

16. The process according to claim 15, wherein said series of recrystallizers are cooled to a temperature from 65° to 80° C.

17. The process according to claim 15, wherein prior to passing to product to a recrystallizers the product to be recrystallized is treated in a centrifuge to enrich it.

18. The process according to claim 17, wherein step (vi) comprises:
(a) forming a melt or solution of said purified lactide;
(b) passing said purified lactide melt or solution continuously through at least one reactor(s) operated at temperatures from 150° to 250° C. and at a pressure ranging from 0.5 to 5 atmospheres at a rate and for a residence time to provide not less than 75% conversion of said monomer mixture to polymer.

19. The process according to claim 18, further comprising passing said melt of polymer through a preheater operated at a temperature from 180° to 220° C. at a pressure from 0.1 to 1.5 atmospheres for a time from 0.5 to 5 minutes.

20. The process according to claim 19, further comprising substantially upon exit from said preheater passing said polymer melt through a devolatilizer operated at a temperature from 150° to 225 ° C. and at a pressure of less than 0.02 atmospheres.

21. The process according to claim 18, wherein said melt or solution of purified lactide passes through a chain of two or more reactors each successive reactor being operated at a temperature of up to 15° C. higher than the preceding reactor.

22. The process according to claim 21, wherein each successive reactor is operated at a temperature from 5° to 10° C. higher than the preceding reactor.

23. The process according to claim 21, wherein said reactors are continuous stirred tank reactors.

24. The process according to claim 22, wherein said devolatilizer is a falling strand devolatilizer.

25. The process according to claim 24, wherein the volatiles recovered from said falling strand devolatilizer is recycled to said reactors or the recrystallization step.

26. The process according to claim 25, further comprising adding to one or more said reactor(s) a catalyst.

27. The process according to claim 26, wherein said catalyst is selected from the group consisting of tin esters of $C_{1-18}$ carboxylic acids.

28. The process according to claim 27, wherein the diluent or solvent for said catalyst is selected from the group consisting of $C_{6-12}$ aromatic solvents, $C_{6-12}$ alkanes which are unsubstituted or substituted by a $C_{1-4}$ alkyl radical which are unsubstituted or substituted by a $C_{1-4}$ alkyl radical, $C_{1-6}$ ketones.

29. The process according to claim 28, wherein said catalyst is stannous octoate.

30. The process according to claim 1 wherein steps (i), (ii) and (iii) are continuous.

31. The process according to claim 1, wherein steps (i) through (iv) are continuous.

32. The process according to claim 1, wherein steps (i) through (v) are continuous.

33. The process according to claim 1, wherein steps (i) through (vi) are continuous.

* * * * *